United States Patent [19]

Kahler

[11] Patent Number: 5,025,378
[45] Date of Patent: Jun. 18, 1991

[54] HORIZONTAL STABILIZER MOTION DETECTOR

[75] Inventor: Jeffrey A. Kahler, Phoenix, Ariz.

[73] Assignee: Honeywell Inc., Minneapolis, Minn.

[21] Appl. No.: 332,852

[22] Filed: Apr. 3, 1989

[51] Int. Cl.$^5$ .................. G05D 1/00; G06F 15/20
[52] U.S. Cl. ......................... 364/424.06; 364/435; 364/572
[58] Field of Search ............ 364/572, 433, 434, 435, 364/424.06; 244/178, 184; 318/584–586

[56] References Cited

U.S. PATENT DOCUMENTS

| 4,337,516 | 6/1982 | Murphy et al. | 364/551 |
| 4,460,964 | 7/1984 | Skutecki et al. | 364/434 |
| 4,599,698 | 7/1986 | Fischer et al. | 364/551 |

Primary Examiner—Thomas G. Black
Attorney, Agent, or Firm—Seymour Levine; Albin Medved; Roger W. Jensen

[57] ABSTRACT

The horizontal stabilizer position is provided to the automatic flight control system software where it is passed through a second order Chebychev motion filter to provide horizontal stabilizer rate. A threshold and hysteresis function detects when the motion exceeds 0.08° per second. While the stabilizer motion exceeds the threshold, a displacement detector determines when the stabilizer position has exceeded 1° since the motion was first detected. When the 1° change in position has occurred while the rate was exceeded, a motion flag is transmitted to the warning system. A sign change detector determines when the output of the motion filter changes sign. A holding latch responsive to the stabilizer position and to the threshold and hysteresis function latches the stabilizer position when the 0.08° per second rate is exceeded. The difference between the latched position and the current position is applied to a threshold detector to determine when the difference exceeds the 1° change in position. The sign change detector unlatches the holding latch when the sign of the output of the motion filter changes. The output of the threshold and hysteresis function remains true until the output of the motion filter falls below 0.055° per second.

12 Claims, 5 Drawing Sheets

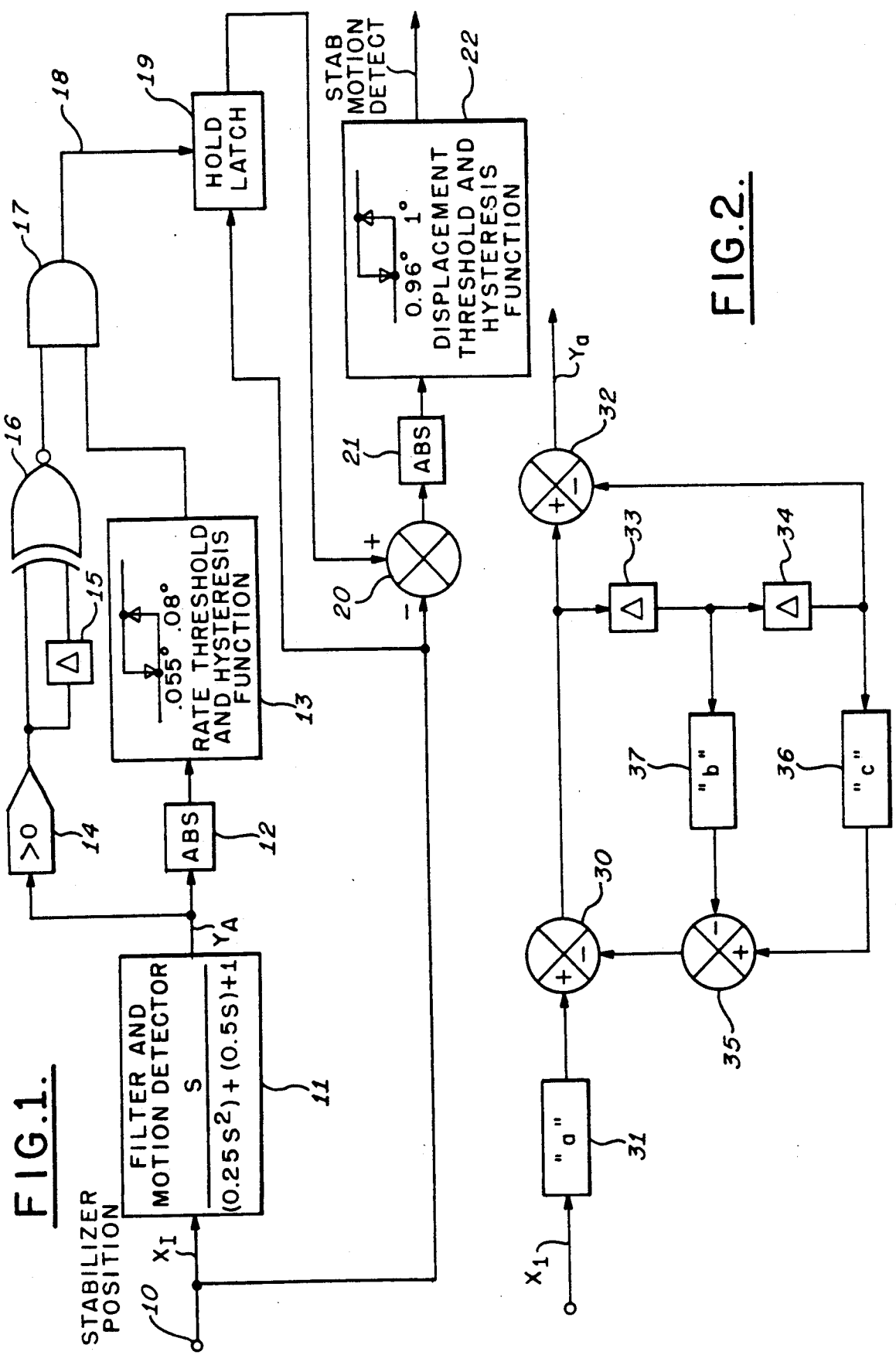

HORIZONTAL STABILIZER MOTION DETECTOR

BACKGROUND OF THE INVENTION

1. Field of the Invention

The invention relates to control surface motion detection for maneuverable craft, particularly with respect to detecting the motion of the horizontal stabilizer of aircraft.

2. Description of the Prior Art

The horizontal stabilizer of modern jet transports is typically utilized in effecting pitch trim of the aircraft. The present day jet transport traditionally includes an automatic flight control system (AFCS) that includes an automatic pitch trim function. In such aircraft, it is necessary to provide the pilot with a warning indication when the rotational rate of the horizontal stabilizer exceeds a predetermined rate through a displacement in excess of a predetermined amount. Typically, the warning system is designed to detect when the horizontal stabilizer has travelled in excess of 1° at a rate of greater than 0.08° per second.

In the prior art, this function is performed in hardware. A shaft angle encoder coupled to the horizontal stabilizer shaft emits pulses as the shaft rotates at a pulse rate in accordance with the rotational rate of the shaft. A counter responsive to the pulses is maintained in a reset state when the pulse rate is less than 0.08° per second. When the pulse rate exceeds 0.08° per second, the reset is released permitting the counter to accumulate the pulses from the encoder. When the pulse count indicates that 1° of motion has occurred since the rate exceeded 0.08° per second, the apparatus effects the stabilizer motion warning. The warning may, for example, be provided to the central aural warning system (CAWS) of the aircraft instrumentation.

Generally, the prior art apparatus performs satisfactorily but requires expensive, bulky and heavy hardware to implement the function. Additionally, installation of the shaft angle encoder is a time consuming and expensive procedure requiring precision alignment. Since the prior art motion warning system is predicated on a mechanical device, the reliability thereof is undesirably low with a concomitant undesirably frequent maintainance schedule.

SUMMARY OF THE INVENTION

In a digital AFCS horizontal stabilizer position is traditionally available in software via an A/D converter. The disadvantages of the prior art are obviated by providing a motion filter in software responsive to stabilizer position for providing an output in accordance with the rate of change of stabilizer position. A first detector in software responsive to the filter output detects when the stabilizer motion exceeds a predetermined rate. During the time the stabilizer motion exceeds the predetermined rate, a second detector in software responsive to the first detector and to the stabilizer position determines when the stabilizer position exceeds a predetermined displacement since the excessive rate was first detected. When such predetermined change in position has occurred, a motion flag is transmitted to the warning system indicating that the horizontal stabilizer is in motion in excess of the predetermined limits. The flag is reset when such excessive motion terminates.

BRIEF DESCRIPTION OF THE DRAWINGS

FIG. 1 is a schematic functional block diagram of the software motion detector implemented in accordance with the present invention.

FIG. 2 is a schematic functional block diagram of a digital implementation of the transfer function of the motion filter of FIG. 1.

DESCRIPTION OF THE PREFERRED EMBODIMENT

Figure 3:
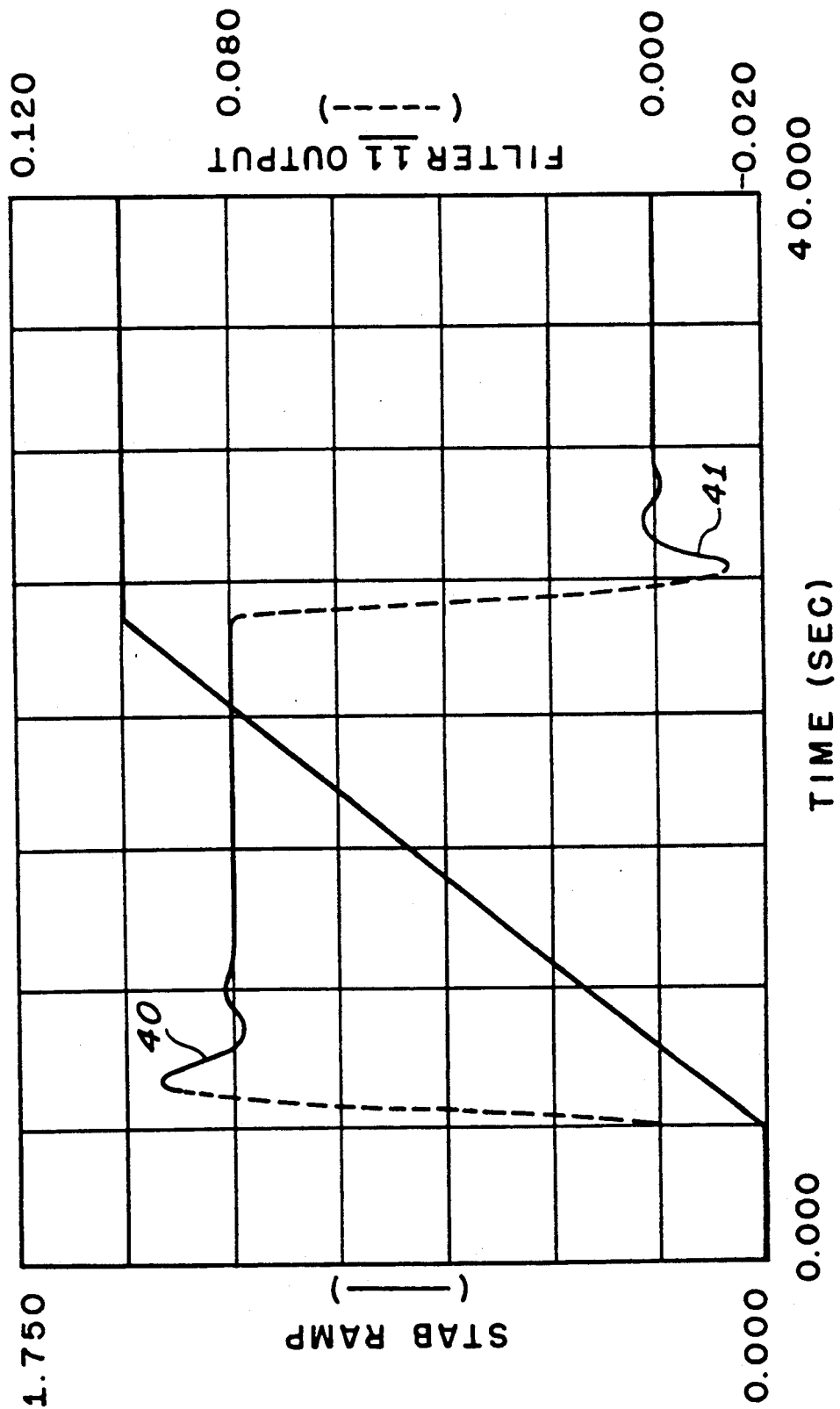
FIG. 3 is a graph of the response of the motion filter of FIG. 1 to horizontal stabilizer motion.

Referring to FIG. 1, the digital stabilizer position is applied at an input 1° to a filter and motion detector 11. The stabilizer position is denoted as $X_I$ and represents the stabilizer position sampled at regular intervals by the system clock to provide a continuous sequence of discrete stabilizer position samples. The output of the filter and motion detector 11 is denoted as $Y_A$. The continuous transfer function of the filter and motion detector 11 is $$S/[(0.25S^2)+(0.5S)+1]$$

Thus the filter and motion detector 11 filters the stabilizer position to remove extraneous frequency components therefrom and detects the motion of the stabilizer by providing $Y_A$ proportional to the rate of change of the stabilizer position. Thus, $Y_A$ is the rotational velocity of the horizontal stabilizer.

An absolute value function 12 provides the absolute value of $Y_A$ which is applied to a rate threshold and hysteresis function 13. The function 13 is set true when 0.08° per second of motion is detected by the function 11 and remains true until the detected motion decreases below 0.055° per second.

$Y_A$ is passed through a greater than zero detector 14 that provides a true output when the stabilizer position is changing in a positive direction and a false output when the stabilizer is stationary or changing in a negative direction. The output of the detector 14 is applied directly and through a one clock delay 15 to a coincidence function 16. The output of the coincidence function 16 is true when the inputs thereto are in agreement and false when the inputs thereto disagree. As is appreciated, the coincidence function 16 is the inverse of an exclusive OR (XOR) function Thus, the logic implemented by the elements 14–16 comprises a sign change detector that detects when the filtered motion of the horizontal stabilizer has passed through zero. When the stabilizer is in motion, the output of the coincidence function 16 is true. When the motion terminates the output of the coincidence function 16 is driven false for one clock period.

The output of the rate threshold and hysteresis function 13 and the output of the coincidence function 16 are applied as inputs to an AND function 17. The output of the AND function 17 is applied as a control input 18 to a hold latch 19. The current horizontal stabilizer position $X_I$ is applied as an input to the hold latch 19 which provides the value held therein as an input to a summing function 20. The current horizontal stabilizer position $X_I$ is applied as a subtractive input to the summing function 20. Thus, the summing function 20 provides the difference between the horizontal position value held in the latch 19 and the current value at the terminal 10. The hold latch 19 outputs the stabilizer position to the summing function 20 that existed at the up clock of the control input 18; i.e., when the control input 18 transitions from the false state to the true state. The output of the hold latch 19 is driven equal to the input thereof when the control input 18 is in the false state.

The output of the summing function 20 is applied through an absolute value function 21 to a displacement threshold and hysteresis function 22. The function 22 detects when the horizontal stabilizer has travelled 1° from the time the stabilizer was determined to be in motion at a rate of 0.08° per second. The output of the function 22 is set true when at least 1° of stabilizer motion has occurred and remains true until the input thereof drops below a level representative of 0.96°. The output of the function 22 is the process output that provides the warning signal to CAWS.

In operation, one clock time after stabilizer motion begins, the output of the coincidence function 16 is true applying an enabling input to the AND function 17. If the motion is below the threshold of 0.08° per second, the output of the function 13 is false resulting in a false signal at the control input 18 to the hold latch 19. The output of the summing function 20 will thus maintained at zero and the output of the function 22 will remain false not indicating a warning condition. If, however, the motion of the horizontal stabilizer exceeds 0.08° per second, the output of the function 13 is driven true and a true level is applied to the control input 18 of the hold latch 19. The hold latch 19 provides to the summing function 20 the horizontal stabilizer position that existed when the control input 18 went true. As long as the motion remains above 0.055° per second, the control input 18 will remain true and the output of the absolute value function 21 will increase. Should this stabilizer motion continue for 1°, the function 22 will go true providing a warning to CAWS. If prior to attaining the 1° threshold, the output of the function 13 goes false, the output of the hold latch 19 will be driven to the input thereof and the output of the absolute value function 21 will be driven to zero. Under this condition, no warning is sent to CAWS. For reasons to be explained hereafter, when the stabilizer motion terminates, the sign change detector 14–16 detects when the output of the filter 11 passes through zero, immediately unlatching the hold latch 19 which in turn terminates the warning to CAWS.

Referring to FIG. 2, a digital implementation of the transfer function of the filter and motion detector 11 is illustrated. The input $X_I$ is applied to a summing function 30 through a gain function 31. The gain function 31 multiplies $X_I$ by a coefficient "a" which in the preferred embodiment of the invention is equal to 0.180180. The output of the summing function 30 is applied as an input to a summing function 32, the output of which provides the filter output $Y_A$. The output of the summing function 30 is delayed by two clock times and the delayed signal is applied as the subtractive input of the summing function 32. The delay is effected by sequential one clock delay functions 33 and 34. The output of the summing function 30 delayed by two clock times via the one clock delays 33 and 34 is also applied to a summing function 35 via a gain function 36. The gain function 36 multiplies the output of the one clock delay 34 by a coefficient "c" which in the preferred embodiment of the invention is equal to 0.819820. The output of the summing function 30 is delayed by one clock time by the one clock delay function 33 and applied to the subtractive input of the summing function 35 via a gain function 37. The gain function 37 multiplies the output of the one clock delay function 33 by a coefficient "b" which in the preferred embodiment of the invention is equal to 1.78378. The output of the summing function 35 is applied as the subtractive input to the summing function 30.

Since the values of clock delays 33 and 34 are not defined when power is first applied and no past values exist, they are set to a valued equal to 5*Xi at power up so that Ya is equal to zero at power up. In this manner, the output of the filter is initialized to zero when power is first applied. The derivation for this is as follows: Ya=A*Xi−(C*CD2−B*CD1)−CD1 where CD1 and CD2 are the outputs of clock delays 33 and 34 respectively. Setting Ya to zero and simplifying the expression on the left: 0=A*Xi+B*CD1−C*CD2−CD1. In order for the initialized value to be a steady state initialized value, CD1 must be equal to CD2 in order for no motion to be taking place given a constant Xi. So, let CD1=CD2=CD: 0=A*Xi+(B−C−1)*CD: CD=A*Xi/(C−B+1): CD=Xi*[A/(C−B+1)]. But A/(C−B+1)=5; therefore the values of devices 33 and 34 are set equal to 5*Xi at power up.

The best estimate of the noise on the stabilizer position is +0.02°. The filter 11 must be capable of detecting 0.08° per second of motion in this noise environment in a reasonably short period of time. The preferred filter for performing this function is a second order Chebychev filter with a cut-off frequency of two radians per second and 1.25 dB of ripple magnitude. A Tustin transformation with a period of 100 milliseconds provides a suitable digital transformation for the filter. The derivation of the Chebychev transfer function is provided in the textbook "Filter Theory and Design: Active and Passive", by A. S. Sedra and P.O.Brackett, pages 115–145, Matrix Publishers, Inc., Beaverton, Oregon. The Tustin transformation algorithm is provided in the textbook "Digital Signal Processing" by A.V. Oppenheim and R.W. Schafer, pages 206–211, Prentice-Hall, Inc., Englewood Cliffs, N.J.

Referring to FIG. 3, the response of the filter 11 to a 0.08° per second ramp of stabilizer motion for 1.5° of travel is illustrated. The left hand vertical scale represents stabilizer motion in degrees of displacement and the right hand vertical scale represents filter output in degrees per second. It is noted that the filter 11 provides an overshoot 40 at the initiation of motion and an overshoot 41 at the termination of the motion. Because of the overshoot 41 on the filter output, the input to the function 13 of FIG. 1 may completely skip the inner hysteresis limit between clock pulses when the stabilizer ceases motion thus delaying the termination of the motion warning. At the clock pulse just before motion ceases, $Y_A$ may be greater than 0.055° per second. At the next clock pulse, which occurs after motion ceases, $Y_A$ may be experiencing the overshoot 41. If the magnitude of the overshoot 41 is greater, than 0.055° per second, the output of the function 13 will remain true and the CAWS warning will remain in effect even though stabilizer motion has ceased. To prevent this from happening, the sign change detector 14–16 detects when $Y_4$ passes through zero and immediately unlatches the hold latch 19 which in turn terminates the warning to CAWS.

Figure 4:
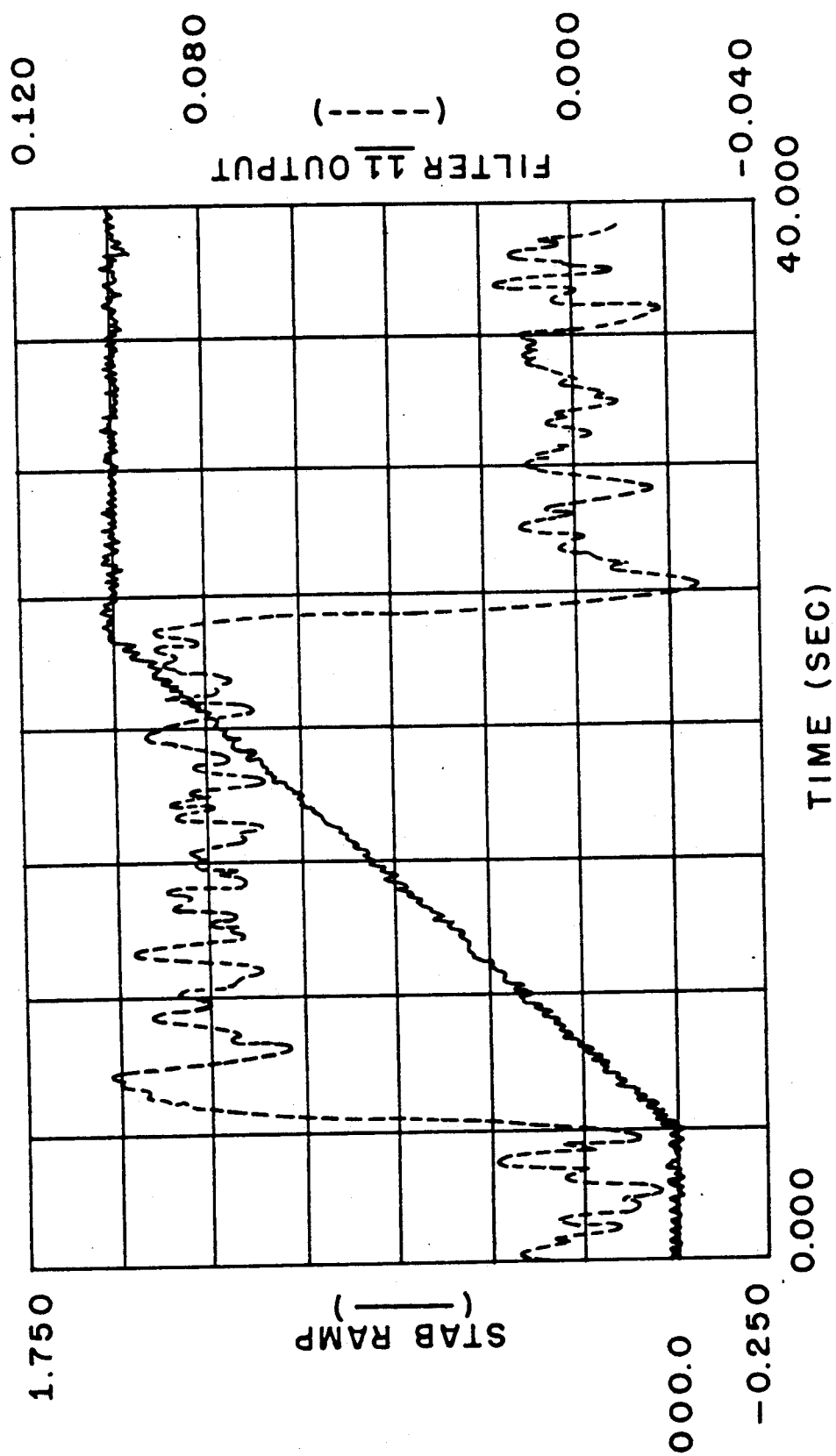
FIG. 4 is a graph, similar to FIG. 3, with the addition of uniformly distributed noise superimposed on the stabilizer position.

Referring to FIG. 4, the same ramp response shown in FIG. 3 is illustrated with the addition of +0.02° of uniformly distributed noise superimposed on the stabilizer position.

Figure 5:
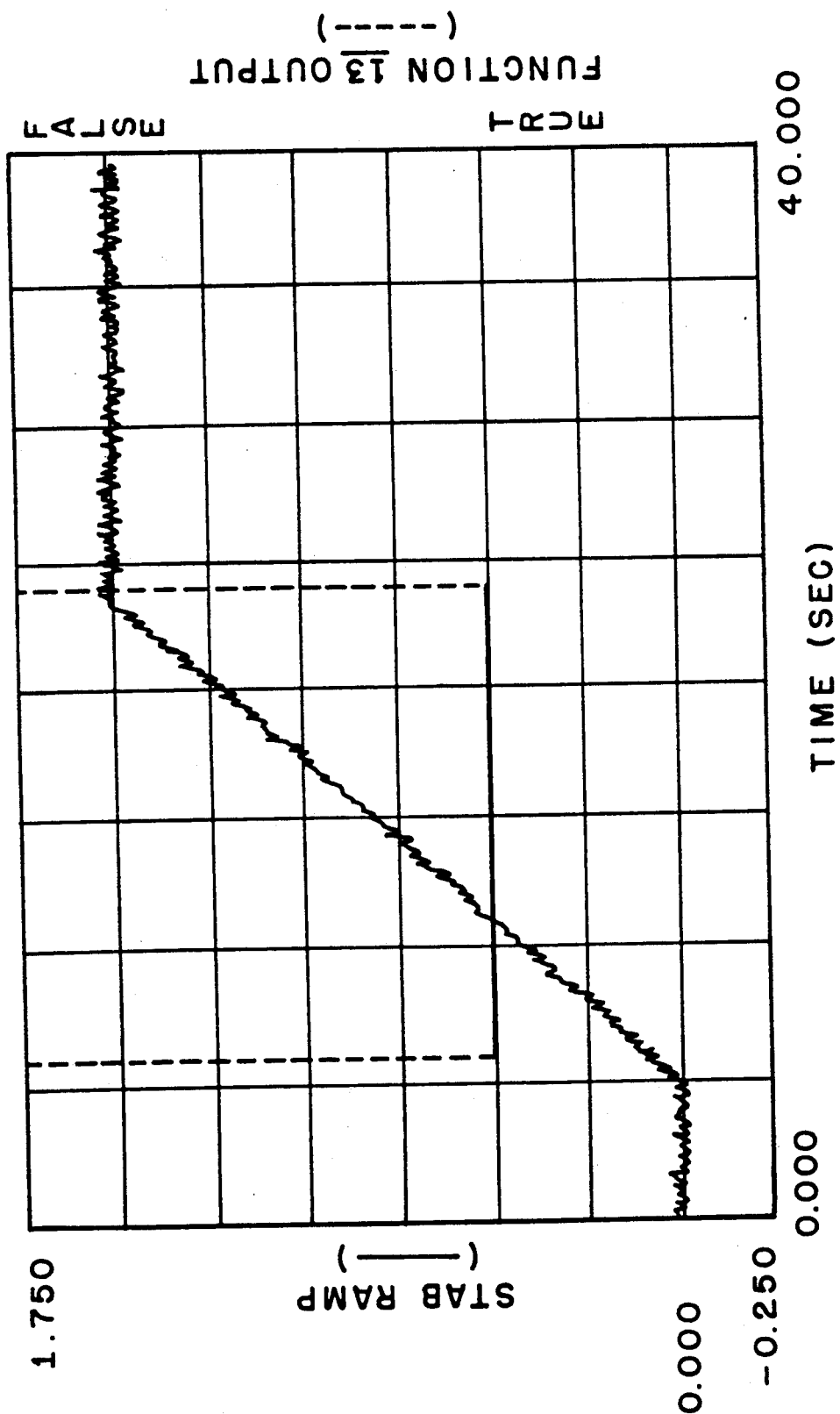
FIG. 5 is a graph of the response of the rate detector block of FIG. 1 to horizontal stabilizer motion.
Figure 6:
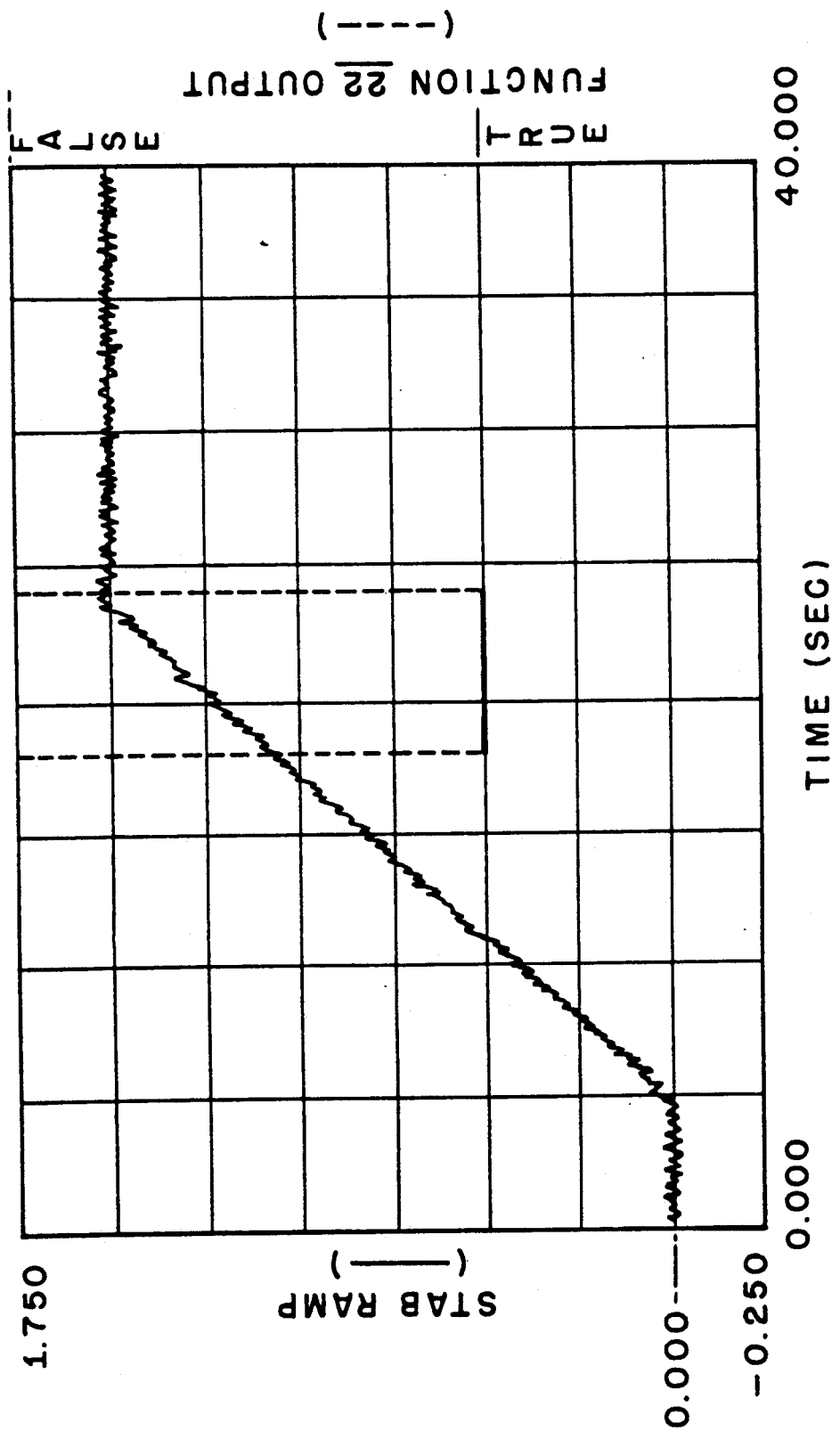
FIG. 6 is a graph of the response of the rotational displacement detector of FIG. 1 to horizontal stabilizer motion.

FIG. 5 illustrates the output of the rate threshold and hysteresis function 13 that detects the stabilizer motion. FIG. 6 illustrates the output of the displacement threshold and hysteresis function 22, the process output that signals that at least 1° of stabilizer motion has occurred at 0.08° per second.

The horizontal stabilizer motion detector of the present invention is a computer process that utilizes digital signal processing technology. Digital filtering and detecting technology is utilized to detect in software when the horizontal stabilizer has travelled in excess of 1° at a rate of greater than 0.08° per second. The invention, performed in software, utilizes only the stabilizer position, which is available to the AFCS software via an A/D converter to determine the motion detection functions. Since stabilizer position is already available in software via the A/D converter, no additional hardware is required to perform the motion detection functions. Thus, the invention inputs stabilizer position from software input processing, passes the position signal through a motion filter and utilizes threshold detection to determine when the motion exceeds 0.08° per second over a displacement of 1°. Compared to the prior art hardware apparatus, the present invention provides a significantly less expensive implementation with a negligible loss of accuracy resulting from the digital quantization of the process.

Although the invention has been explained in terms of the functional diagrams of FIGS. 1 and 2, it is appreciated that flow charts and coding implementing the illustrated functionality are readily derivable by the routineer in the art.

Although the preferred embodiment of the invention was explained in terms of detecting motion of the horizontal stabilizer of an aircraft, it is appreciated that the concepts of the invention are applicable to any aircraft control surface. It is further appreciated that the concepts of the invention are similarly applicable to detecting the motion of a control surface of any maneuverable vehicle such as a submarine.

While the invention has been described in its preferred embodiment, it is to be understood that the words which have been used are words of description rather than limitation and that changes may be made within the purview of the appended claims without departing from the true scope and spirit of the invention in its broader aspects.

I claim:

1. Programmed computer apparatus for generating a warning signal in response to a position signal of a control surface of a maneuverable craft when said control surface exceeds a predetermined rate of displacement over a predetermined displacement, said position signal being proportional to the displacement of said control surface, said apparatus comprising motion filter means responsive to said position signal for providing an output signal in accordance with the rate of change of said position signal, first threshold means for detecting when said output signal of said motion filter means exceeds said predetermined rate and providing a logic signal in accordance therewith, and second threshold means responsive to said logic signal and said position signal for providing said warning signal when said position signal indicates that said control surface has traversed a displacement greater than said predetermined displacement while said logic signal has indicated that said output signal of said motion filter means was exceeding said predetermined rate, wherein said second threshold means comprises a holding latch responsive to said logic signal and said position signal for latching said position signal existing when said logic signal indicates said output signal of said motion filter means exceeding said predetermined rate, thereby providing a latched position signal, difference means responsive to said position signal and said latched position signal for providing a difference signal representative of the difference therebetween, and a threshold detector responsive to said difference signal for providing said warning signal when said difference signal indicates a displacement of said control surface greater than said predetermined displacement.

2. The apparatus of claim 1 wherein said motion filter means comprises a digital filter with a transfer function:

$$S/[(mS^2)+(nS)+1].$$

3. The apparatus of claim 2 wherein said transfer function comprises:

$$S/[(0.25S^2)+(0.5S)+1].$$

4. The apparatus of claim 1 wherein said holding latch provides said latched position signal equal to said position signal when said logic signal is not indicating said output signal of said motion filter means exceeding said predetermined rate.

5. The apparatus of claim 4 further including sign change detector means responsive to said output signal of said motion filter means for detecting when the sign thereof changes polarity, thereby providing a sign change signal in accordance therewith, said holding latch being responsive to said sign change signal for rendering said latched position signal equal to said position signal when said sign change signal indicates said change of polarity.

6. The apparatus of claim 5 wherein said sign change detector means comprises a polarity detector for detecting when said output signal of said motion filter means is of a predetermined polarity, thereby providing a polarity detector output signal, delay means for delaying said polarity detector output signal thereby providing a delayed polarity detector output signal, and coincidence detector means responsive to said polarity detector output signal and said delayed polarity detector output signal for providing said sign change signal in accordance therewith.

7. The apparatus of claim 1 further including absolute value taking means coupled between said difference means and said threshold detector for taking the absolute value of said difference signal and providing said absolute value of said difference signal to said threshold detector.

8. Programmed computer apparatus for generating a warning signal in response to a position signal of a control surface of a maneuverable craft when said control surface exceeds a predetermined rate of displacement over a predetermined displacement, said position signal being proportional to the displacement of said control surface, said apparatus comprising motion filter means responsive to said position signal for providing an output signal in accordance with the rate of change of said position signal, said motion filter means comprising a Chebychev filter, first threshold means for detecting when said output signal of said motion filter means exceeds said predetermined rate and providing a logic signal in accordance therewith, and second threshold means responsive to said logic signal and said position signal for providing said warning signal when said position signal indicates that said control surface has traversed a displacement greater than said predetermined displacement while said logic signal has indicated that said output signal of said motion filter means was exceeding said predetermined rate.

9. The apparatus of claim 8 wherein said motion filter means comprises a second order Chebychev filter.

10. The apparatus of claim 9 wherein said motion filter means comprises a second order Chebychev filter with a cut-off frequency of two radians per second.

11. The apparatus of claim 10 wherein said motion filter means comprises a second order Chebychev filter with 1.25 dB of ripple magnitude.

12. The apparatus of claim 9 wherein said motion filter means comprises a second order Chebychev filter having a digital Tustin transformation with a period of 100 milliseconds.

* * * * *